United States Patent [19]

Jaffe et al.

[11] Patent Number: 4,855,961

[45] Date of Patent: Aug. 8, 1989

[54] IMAGING APPARATUS

[75] Inventors: Jules S. Jaffe, Waquoit; Philippe Cassereau, Mashpee, both of Mass.; Tomomasa Sato, Sakura, Japan

[73] Assignee: Woods Hole Oceanographic Institute, Woods Hole, Mass.

[21] Appl. No.: 892,332

[22] Filed: Jul. 31, 1986

[51] Int. Cl.$^4$ .............................................. G03B 42/06
[52] U.S. Cl. ........................................ 367/7; 367/11; 367/88; 367/101; 367/103
[58] Field of Search ..................... 367/7, 11, 88, 103, 367/105, 101; 358/112

[56] References Cited

U.S. PATENT DOCUMENTS

| | | | |
|---|---|---|---|
| 3,895,340 | 7/1975 | Gilmour | 367/88 |
| 4,119,940 | 10/1978 | Keating et al. | 367/11 |
| 4,200,922 | 4/1980 | Hagemann | 367/88 |
| 4,216,537 | 8/1980 | Delignieres | 367/88 |
| 4,403,311 | 9/1983 | Tournois | 367/88 |
| 4,403,314 | 9/1983 | Tournois | 367/11 |
| 4,456,982 | 6/1984 | Tournois | 367/11 |
| 4,458,342 | 7/1984 | Tournois | 367/88 |
| 4,597,087 | 6/1986 | Kadin | 370/105 |
| 4,694,434 | 9/1987 | Von Ramm et al. | 367/7 |

OTHER PUBLICATIONS

Lee et al., J. Acoust. Soc. Am. 68(1), Jul. 1980, pp. 320–328.
Furgason, 1982 Ultrasonics Symposium, pp. 919–928.
Dixon, Spread Spectrum Systems, 1984, pp. 79–81.
Sarwate et al., Proc. IEEE, vol. 68, No. 5, May 1980, pp. 593–619.
Tournois, IEEE Ultrasonics Symposium Proceedings, Nov. 1980, pp. 747–750.
Kaihoh et al., OKI Electric Industry Co. publication.
OKI Electric Industry Co. publication, "Okismic-400 Underwater Acoustic Imaging System".

Primary Examiner—Thomas H. Tarcza
Assistant Examiner—Daniel T. Pihulic

[57] ABSTRACT

Imaging apparatus including an array of transmitters for simultaneously transmitting more than two coded signal beams in different directions to cover different regions of a field of view, said beams being modified by objects within said field of view, signal means for providing individual coded signals to respective transmitters, at least one receiver for simultaneously receiving plural coded modified signals derived from the coded signal beams, and a processor for separating the plural coded modified signals of different codes and processing them into an image signal.

26 Claims, 2 Drawing Sheets

IMAGING APPARATUS

FIELD OF THE INVENTION

The invention relates to creating images by transmitting signals and sensing the effect of objects in the field of view on the signals.

BACKGROUND OF THE INVENTION

Images can be created by transmitting signals to the field of view and detecting the reflections from objects within the field or by detecting the attenuated signals after passing through the field of view. This may involve using an array of detectors to simultaneously obtain information about different regions in the field of view or scanning the field of view by sequentially receiving signals from different regions in the field of view.

Keating et al. U.S. Pat. No. 4,119,940, which is hereby incorporated by reference, discloses a sonar imaging system employing four transmitters sending omni-directional signals at different frequencies and an array of detectors to receive the signals. A processor is used to separate the different frequencies of the reflected signals, and it is mentioned that the use of plural frequencies increases the resolution.

Lee and Furgason, "Use of noise signals for multimode operation of phased arrays", *J. Accoust. Soc. Am.* 68(1), July 1980, pp. 320–328, discloses scanning using N different coded beams directed in different directions, a signal receiver, and processing to separate reflections having different codes; in the disclosed example two uncorrelated noise sources are used to produce beams in two directions, and two correlators are used to detect the reflected signals. Furgason, "Optimal Operation of Ultrasonic Correlation Systems", 1982 Ultrasonics Symposium, pp. 919–928, discloses using Golay codes, paired complementary binary codes, for the two coded beams transmitted in different directions. Lee and Furgason, "Golay Codes for Simultaneous Multi-Mode Operation in Phased Relays", 1982 Ultrasonics Symposium, pp. 821–825, similarly discloses using Golay codes and notes that they have good autocorrelation and zero cross-correlation.

SUMMARY OF THE INVENTION

We have discovered that we can quickly provide high resolution sonar images by triggering an array of transmitters to simultaneously transmit coded signal beams in different directions so as to each cover a different region of a field of view, simultaneously sensing the effect of objects in the field of view on the signals at at least one receiver, and processing the received signals to separate those of different codes (i.e., from different beams) and to construct an image.

In preferred embodiments the received signals are caused by reflections of objects in the field; the codes used are pseudo-random noise codes; the codes are Gold codes (most preferably the Kasami subset of Gold codes); there are a plurality of receivers in a crossed receiver array; the transmitter array includes a plurality of transmitters in rows or columns, each transmitter being at an angle with respect to the adjacent four transmitters so as to be directed in a different direction; there are sixteen transmitters in a four-by-four array; each transmitter has a field of view of about 15°, and makes angles of 15° with adjacent transmitters; the device is used on an underwater robot; each transmitter has a separate memory incorporating its code and a D/A converter; and each receiver has an associated buffer memory and an A/D converter.

Other advantages and features of the invention will be apparent from the following description of a preferred embodiment thereof and from the claims.

PREFERRED EMBODIMENT

The preferred embodiment will now be described.

DRAWINGS

STRUCTURE

Figure 1:
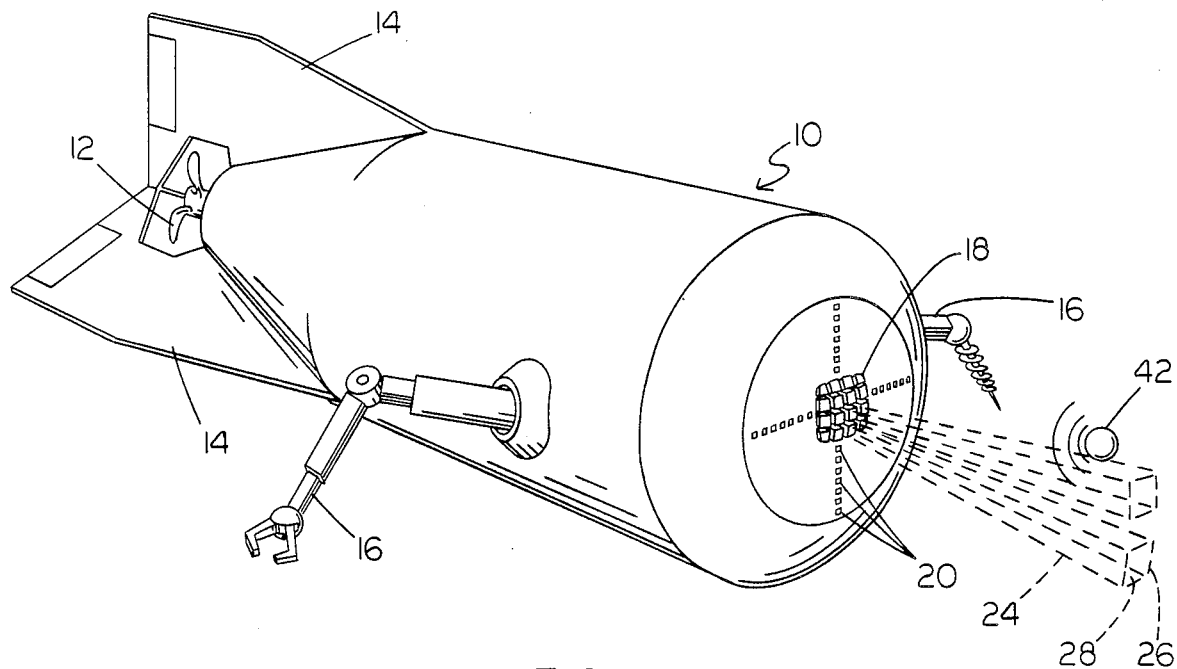
FIG. 1 is a diagrammatic view of an underwater robot including imaging apparatus according to the invention.

Referring to FIG. 1, there is shown underwater robot 10, shown very diagrammatically as including propeller 12 and fins 14 to provide motion and arms 16 to engage underwater objects. At the front of robot 10 are sixteen ultrasonic piezoelectric transmitters 18 and sixty-four ultrasonic piezoelectric hydrophone receivers 20 of imaging system 22, shown in FIG. 2. The transmitters have a bandwidth of 40–50% of the operating center frequency. Transmitters 18 are circular (though they are shown diagrammatically as square in the drawings) having a 5.8 mm diameter, and are spaced from each other in a four-by-four array, and transmit diverging beams 24 that are directed along axes that are 15° from those of adjacent transmitters so that the array sweeps out of 60° field of view. Each transmitter 18 is at a 15° angle with respect to adjacent transmitters. Receivers 20 form a crossed array, thirty-two receivers along each of two perpendicular axes, thus permitting division of each region 26 of the field of view of each beam 24 into 1024 separate segments 28. Receivers 20 are 1½ mm square and are spaced from adjacent receivers by 5.7 mm.

Figure 2:
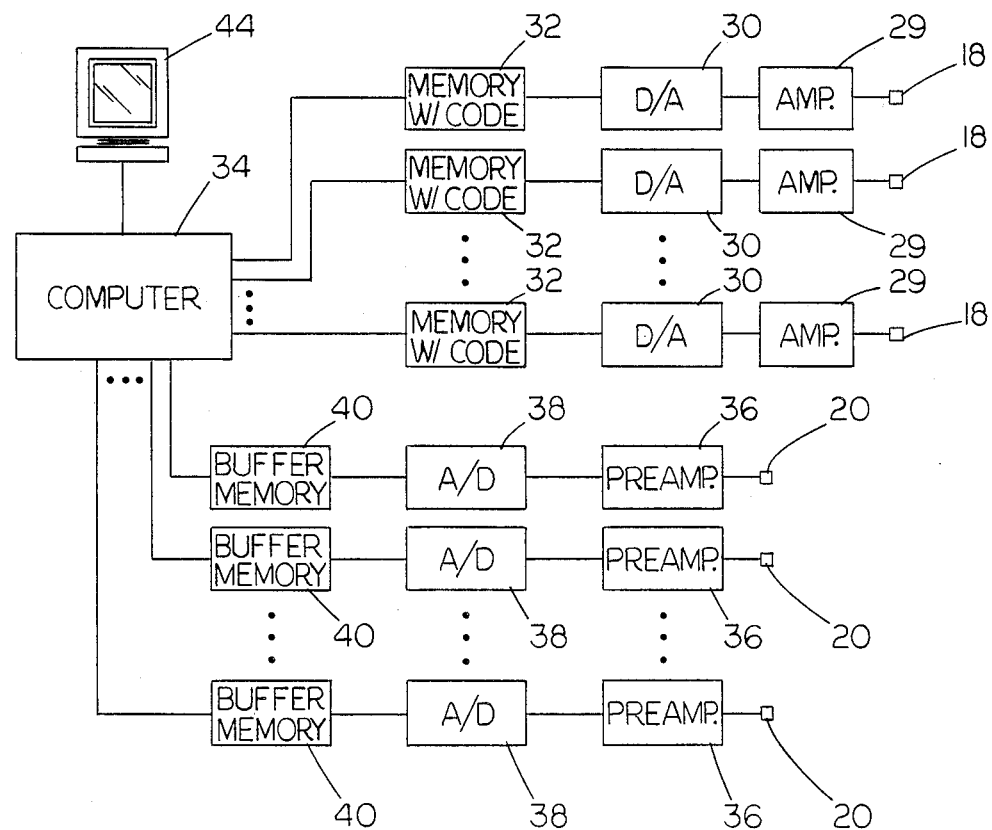
FIG. 2 is a block diagram showing the electronic circuitry of FIG. 1 imaging system.
Figure 3:
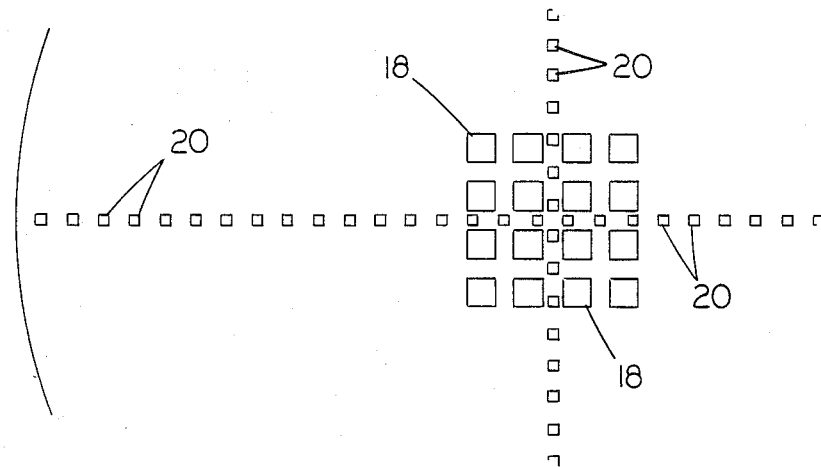
FIG. 3 is an enlarged partial diagram showing the arrangement of transmitters and receivers.

Referring to FIG. 2, it is seen that each transmitter 18 has an associated power amplifier 29, 12-bit digital-to-analog converter 30 operating at 10 megahertz and memory 32 (a RAM) connected for receiving its respective code and triggering by computer 34. Each receiver 20 similarly has an associated preamplifier 36, 12-bit analog-to-digital converter 38, and buffer memory 40 connected to computer 34.

The pseudo-random noise Gold codes stored in memories 32 are 255 digit-long strings of binary digits. They are described in Dixon, *Spread Spectrum Systems*, J. Wiley and Sons, 1984, particularly pages 79–81, which is hereby incorporated by reference. Gold codes are employed because they have desired good auto correlation and small cross-correlation. The Kasami subset of Gold codes, described, e.g., in Sarwate & Pursley, "Cross-Correlation Properties of Pseudorandom and Related Sequences", Proc. IEEE, Vol. 68, No. 5, pp. 593–619, May 1980, particularly pp. 607–608, which is hereby incorporated by reference, in particular are expected to be optimal. As described in the cited publications, a subset of 16 sequences is selected from the set of Gold codes which are generated from a preferred pair of m-sequence (2 m-sequences with a three valued cross-correlation function) by adding the two shifted sequences together for all possible shifts.

In the underwater robot 10 application, having a desired range of ten to twenty meters, a one megahertz signal is appropriate as a balance between obtaining the highest frequency possible without achieving intolerable attenuation of the transmitted sound in the water. Also, the closest return is one meter, which limits the pulse length to approximately 1.5 ms. The larger number of digits per code, the more codes are possible, but the number of digits (which has an associated time period) is limited by the time-bandwidth product (in addition to the closest return limitation just mentioned), a measured characteristic of the medium (here seawater) relating to a period of time during which signals remain constant. For the seawater of interest, sixteen Gold codes are permitted, hence the four-by-four array. Where the time-bandwidth product is longer, more transmitters can be used in the array to provide better resolution.

OPERATION

In operation, computer 34 sequentially loads memories 32 with their respective 255 digit Gold codes, and then triggers all memories 32 simultaneously to send out their respective streams of binary digits, a little over one millisecond long, to respective digital-to-analog converters 30, which use the digits to provide phase modulation of the 1 megahertz analog output to power amplifiers 29 and transmitters 18, each digit used to set the phase of four cycles.

Coded beams 24 extend along axes diverted from adjacent beam axes by 15° and sweep out of 60° field of view. When the transmitted beam hits an object 42, a signal is reflected and sensed a short time later at the crossed array of receivers 20. The reflected signals arrive at the crossed array at slightly different times owing to the different distances to the objects to which there is a reflection.

The received signals are amplified by preamplifiers 36, digitized at analog-to-digital converters 38, and temporarily stored in buffer memories 40, which are unloaded in sequence to computer 34 for image construction.

Figure 4:
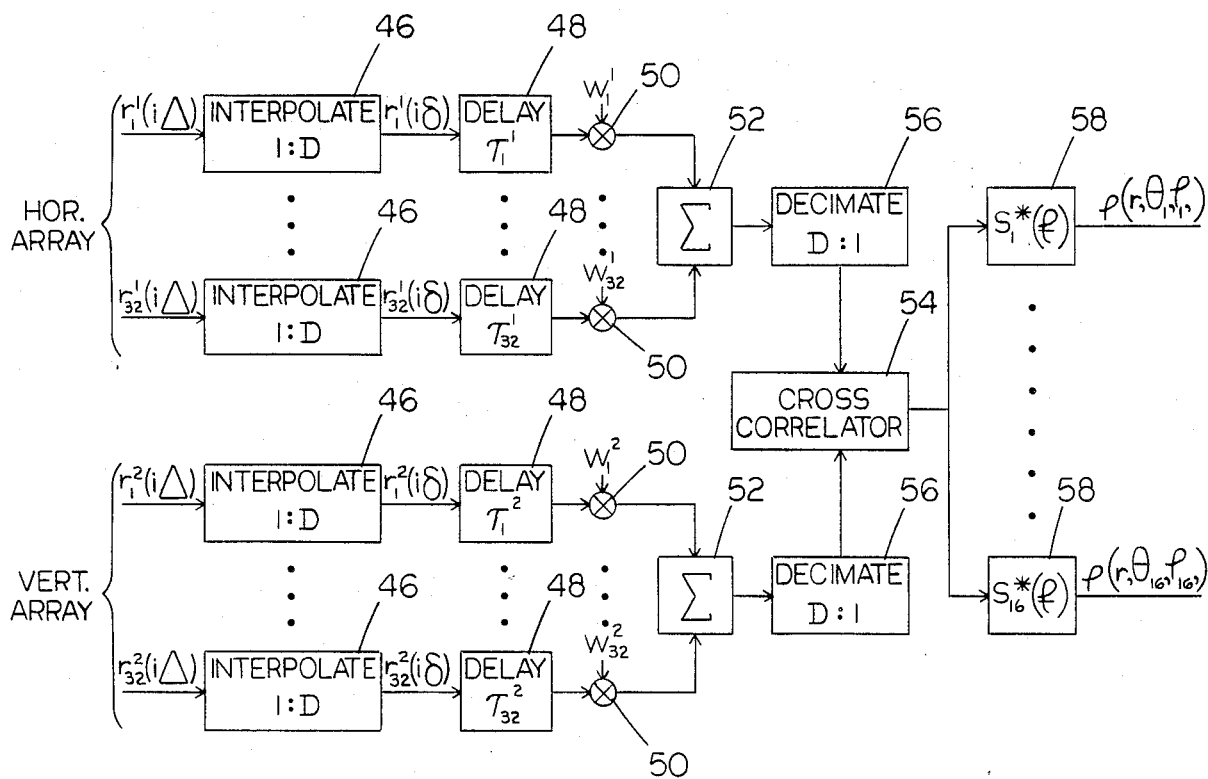
FIG. 4 is a block diagram showing the image construction technique.

Referring to FIG. 4, there is shown the three dimensional reconstruction technique performed by computer 34, operating as an off-line signal processor for the received signals. The three dimensional reconstruction of an acoustic image is performed in two major steps: (1) spatial processing (beam forming) first to resolve the angular position of the object, and (2) temporal processing to resolve the range and reflectivity of the object.

The signals $r^2{}_1(id),...,r^1{}_{32}(id)$ represent the 32 signals received by the horizontal array of receivers sampled at rate d. Likewise, the signals $r^2{}_1(id),...,r^2{}_{32}(id)$ represent the 32 signals received by the vertical array sampled at rate d. As the sampling of the received signals is performed above the Nyquist rate of 2.5 MH$_z$, interpolation filters 46 can be used to up-sample the signals to a rate $\delta$. The interpolation allows the use of incremental values for the delay which are small enough to reduce the problem of sidelobes due to quantization. Time delays provided at 48 in FIG. 4 are used to "steer" the two phased arrays; the angular coordinates $\theta, \psi$, of each of the desired beams uniquely define the value of these delays. The weights, $W^1{}_1,...,W^1{}_{32}, W^2{}_1...W^2{}_{32}$, provided at 50 in FIG. 4, correspond to the shading parameters for each array. These are chosen to decrease the sidelobe level significantly and improve the beam pattern of a simple delay-and-sum beamformer. To achieve the product of the two beam patterns, the outputs of the summers 52 of the two weight-and-sum interpolations are cross-correlated at correlator 54 after decimation at 56. This completes the spatial processing, the resultant signal being the reflection from a given $\theta, \psi$, of the 1024 combinations of $\theta, \psi$.

The signal that results from this process is the superposition of 16 narrow beams 24, each falling within a differently coded spatial region. In order to separate these 16 beams in order to resolve the range of each target, the output of the spatial cross-correlator goes through 16 filters 58 matched to the 16 transmitted coded signals $S_k(t)$, $k=1,...16$. The resultant functions correspond to the reflectivity as a function of range for the 16 different angular directions. The range and reflectivity of each target can then be resolved. By changing the delays provided at 48, the beams can be scanned across the entire field of view, yielding a complete three-dimensional image. The operations mentioned above can be implemented most expeditiously by using well known FFT techniques.

The use of crossed array of transmitters 20 effectively breaks each 15° beam 24 into 1024 sectors (the product of the receivers along the horizontal axis times the receivers along the vertical axis). Computer 34 provides a signal to display device 44 (e.g., a CRT) after conversion to desired video signals. Computer 34 also stores the image information for later retrieval and analysis. An advantage of the imaging system is that it can operate in environments where optical visibility is impaired, e.g., in visually opaque turbid water. By simultaneously transmitting and receiving the slow sound beams, the total time necessary for acquiring a single image is greatly reduced over sequential scanning.

The system can collect three-dimensional images on the order of 128 × 128 pixels at frame rates of at least five frames per second. High resolution is provided, because the receivers are spaced from each other (5.7 mm) as much as possible in the coded 15° beam arrangement (in order to increase resolution) without resulting in problems from interference grating lobes, caused by the fact that the distance between receivers is greater than one-half the sonar wavelength, 1.5 mm. Grating lobes are allowed to occur, but the design ensures that two adjacent lobes (main lobe and/or grating lobe) do not fall within the same transmitted beam. The resulting interferences between the different beams can then be rejected using the cross-correlation rejection properties of the coded signals. As the beam width of the transmitted beam is 15°, the largest allowed spacing, D, is given by $$\sin 7.5° = \frac{\text{lambda}}{2D}$$

$$D = 3.8 \text{ lambda}$$

For 32 elements, the corresponding resolution is 0.5°; for the same array with one-half lambda spacing (to avoid interference of lobes), the resolution is 3.6°.

Other Embodiments

Other embodiments of the invention are within the scope of the following claims. For example, other codes such as other pseudo-random noise codes having sufficient autocorrelation and small cross-correlation or different frequencies can be used. Other modulation besides phase modulation, e.g., frequency modulation (including frequency hop coding) and amplitude modulation, can be used. Depending upon the coherence characteristics of the medium, the preferred modulation could be frequency modulation instead of phase modulation. In the preferred seawater application, the preferred use of pseudo-random noise codes, however, gives better range resolution than frequency codes. Similarly, the invention applies to imaging in media other than water, to beams other than sonic beams and to other frequencies and to detecting attenuated signals that have passed through an object, e.g., in tomography apparatus.

Memories 32 could be EPROMS instead of random access memories.

What is claimed is:

1. Imaging apparatus comprising
   an array of transmitters for simultaneously transmitting more than two unique coded signal beams in different directions to cover different, mutually exclusive regions of a field of view so as to uniquely identify a said region by the beam passing through it, said beams being modified by objects within said field of view,
   signal means for providing individual coded signals to respective said transmitters,
   a plurality of receivers in an array for simultaneously receiving plural coded modified signals derived from said coded signal beams,
   a processor for separating the plural coded modified signals of different codes and processing them into an image signal.

2. The apparatus of claim 1 wherein said modified signals are reflections, and said receivers is in position to receive said reflections.

3. The apparatus of claim 1 wherein said signal means provides pseudo-random noise Gold codes.

4. The apparatus of claim 3 wherein said codes are Kasami codes.

5. The apparatus of claim 1 wherein said codes are frequency hop codes.

6. The apparatus of claim 2 wherein each receiver has an associated analog-to-digital converter and a buffer connected to a computer.

7. The apparatus of claim 1 wherein said receivers are in a crossed array long two perpendicular axes, more than two receivers being along each said axis, the spacing between receivers being greater than one-half the wavelength of said coded signal beams.

8. The apparatus of claim 2 wherein said transmitter array includes transmitters in columns and rows, each said transmitter providing a beam in a different direction.

9. The apparatus of claim 8 wherein there is a fourby-four array of transmitters.

10. The apparatus of claim 2 wherein said signal means comprises a memory and a digital-to-analog converter associated with each transmitter, and a computer for triggering said memories simultaneously.

11. The apparatus of claim 10 wherein said computer generates said coded signals from a pair of m-sequences.

12. The apparatus of claim 8 wherein said receivers are in a crossed-array.

13. The apparatus of claim 2 wherein said signals are phase modulated.

14. The apparatus of claim 13 wherein there are at least sixteen transmitters in a four-by-four array.

15. The apparatus of claim 14 wherein said transmitters are at angles of approximately 15° from adjacent transmitters.

16. Underwater probing apparatus comprising a body,
    a mechanism for propelling said body carried by said body,
    an array of transmitters carried by said body for simultaneously transmitting more than two unique coded signal beams in different directions, to cover different mutually exclusive regions of a field of view so as to uniquely identify a said region by the beam passing through it, said beams being modified by objects within said field of view,
    signal means for providing individual coded signals to respective said transmitters,
    a plurality of receivers in an array for simultaneously receiving plural coded reflections of said coded signal beams, and
    a processor for separating the plural coded reflections of different codes and processing them into an image signal.

17. The apparatus of claim 16 wherein said signals are phase modulated.

18. Apparatus of claim 16 wherein said transmitter array includes transmitters in columns and rows, each said transmitter providing a beam in a different direction.

19. The apparatus of claim 18 wherein said receivers are in a crossed array long two perpendicular axes, more than two receivers being along each said axis, the spacing between receivers being greater than one-half the wavelength of said coded signal beams.

20. The apparatus of claim 19 wherein there are at least sixteen transmitters in a four-by-four array.

21. The apparatus of claim 20 wherein said transmitters are at angles of approximately 15° from adjacent transmitters.

22. The apparatus of claim 16 wherein said signal means provides pseudo-random noise Gold codes.

23. The apparatus of claim 22 wherein said codes are Kasami codes.

24. The apparatus of claim 16 wherein said signal means comprises a memory and a digital-to-analog converter associated with each transmitter, and a computer for triggering said memories simultaneously.

25. The apparatus of claim 24 wherein said computer generates said coded signals from a pair of m-sequences.

26. The apparatus of claim 19 wherein each receiver has an associated analog-to-digital converter and a buffer connected to a computer.

* * * * *